United States Patent [19]

Tsuji et al.

[11] Patent Number: 5,265,480
[45] Date of Patent: Nov. 30, 1993

[54] TORQUE DETECTOR

[75] Inventors: Yorikazu Tsuji; Seiji Okada, both of Yokohama, Japan

[73] Assignee: Mazda Motor Corporation, Hiroshima, Japan

[21] Appl. No.: 745,884

[22] Filed: Aug. 16, 1991

[30] Foreign Application Priority Data

Aug. 23, 1990 [JP] Japan .................................. 2-222096
Aug. 23, 1990 [JP] Japan .................................. 2-222097

[51] Int. Cl.$^5$ .............................................. G01L 3/02
[52] U.S. Cl. .......................... 73/862.325; 73/862.324; 73/862.326; 324/209
[58] Field of Search ................... 73/862.324, 862.325, 73/862.326, 862.328; 324/207.13, 207.25, 209, 207.22, 233

[56] References Cited

U.S. PATENT DOCUMENTS

| | | | |
|---|---|---|---|
| 2,978,902 | 4/1961 | Felder | 73/862.326 |
| 3,049,003 | 8/1962 | Felder | 73/862.326 |
| 4,444,064 | 4/1981 | Wolfinger | 73/862.326 |
| 4,513,627 | 4/1985 | Kohama et al. | 73/862.328 |
| 4,764,767 | 8/1988 | Ichikawa et al. | 324/207.22 X |
| 4,783,626 | 11/1988 | Shimiza | 73/862.325 |
| 4,783,998 | 11/1988 | Sander | 73/862.324 |
| 4,875,379 | 10/1988 | Rohs et al. | 73/862.326 |
| 4,984,474 | 1/1991 | Matsushima et al. | 324/207.22 X |
| 5,031,459 | 7/1991 | Twerdochlib | 73/862.328 X |
| 5,067,355 | 11/1991 | Witte | 73/862.326 |
| 5,130,649 | 7/1992 | Kumagai | 324/207.22 X |
| 5,200,698 | 4/1993 | Thibaud | 324/207.22 |

FOREIGN PATENT DOCUMENTS

| | | | |
|---|---|---|---|
| 3821083 | 7/1990 | Fed. Rep. of Germany . | |
| 59-27230 | 2/1984 | Japan | 73/862.326 |
| 61-53504 | 3/1986 | Japan . | |
| 62-6129 | 1/1987 | Japan . | |
| 62-95433 | 5/1987 | Japan | 73/862.328 |
| 62-239031 | 10/1987 | Japan . | |
| 1352275 | 5/1974 | United Kingdom . | |

Primary Examiner—Richard E. Chilcot, Jr.
Assistant Examiner—Elizabeth L. Dougherty
Attorney, Agent, or Firm—Sixbey, Friedman, Leedom & Ferguson

[57] ABSTRACT

First and second magnetic layers are respectively fixed in two positions on a peripheral face of a rotary shaft. A magnetizing pattern is preformed at a constant pitch solely on a magnetic face of the first magnetic layer. In a preparatory step, the magnetizing pattern is copied onto a magnetic face of the second magnetic layer, so that a torque detection step is started. In the torque detection step, there is detected phase difference between reproducing signals of two magnetic heads owing to the torsional deformation of the rotary shaft caused by torque. In addition, the number of rotations for a unit time of the rotary shaft is detected based on one of the reproducing signals. Consequently, the applied torque can be obtained by calculation based on the phase difference and the number of rotations for a unit time.

11 Claims, 7 Drawing Sheets

TORQUE DETECTOR

BACKGROUND OF THE INVENTION

The present invention relates to a device for detecting torque applied to a rotary shaft to be rotated, and more particularly to a torque detector to be mounted on a car wherein the torque applied to the rotary shaft such as an output shaft of a transmission of the car is found by a quantity of torsion of the rotary shaft.

Recently, there has been increased the necessity of torque detection in the car. Referring to an automatic transmission using a torque converter, particularly, feedback control is executed by using the torque of the output shaft, which is precisely detected, so that the characteristics of the automatic transmission can greatly be enhanced. Referring to a four wheel drive, it is very important to detect torque distribution between front and rear wheels.

When the torque is applied to the rotary shaft, the torsional deformation, which is proportional to the torque, occurs on the rotary shaft. When the applied torque is represented by T, a torsional angle $\theta$ of the rotary shaft is found by the following formula (1). The torsional angle $\theta$ is measured between two positions which are separated from each other by a distance L in the axial direction of the rotary shaft;

$$\theta = 64TL/2\pi Gd^4 \qquad (1)$$

where d is a diameter of the rotary shaft, and G is a transverse elastic modulus which is determined by the material of the rotary shaft. The formula (1) is transformed as follows.

$$T = 2\pi\theta Gd^4/64L \qquad (2)$$

If the diameter d and the transverse elastic modulus G of the rotary shaft are known values, the applied torque T can be calculated with the formula (2) by using the torsional angle $\theta$ of the rotary shaft measured between the two positions which are separated from each other by a distance L in the axial direction of the rotary shaft.

There have been proposed various torque detectors in accordance with the above-mentioned principle. There has been known a torque detector using two optical rotary encoders. Japanese Unexamined Patent Publication No. 62-239031 has disclosed a torque detector using two magnetic rotary encoders comprising magnetic drums or magnetic disks as magnetic scales and non-movable magnetic sensors. The magnetic scales are individually and coaxially fixed to the rotary shaft in two positions separated from each other by a distance L in the axial direction of the rotary shaft. The non-movable magnetic sensors are provided opposite to the magnetic faces of the magnetic scales. Each of the magnetic scales is premagnetized such that a lot of magnetic poles are arranged at a constant pitch over the entire periphery of the magnetic face before it is fixed to the rotary shaft. Each of the magnetic sensors includes a magnetoresistive effect element for converting the change of magnetic flux into a cyclic electric signal and outputting the same. The change of magnetic flux is caused by the magnetizing patterns on the magnetic faces of the magnetic scales while the rotary shaft is rotated. Two sets of magnetic scales and magnetic sensors form two magnetic rotary encoders for measuring the torsional angle $\theta$ of the rotary shaft.

When the torsional deformation occurs on the rotary shaft owing to the torque, phase difference, which is proportional to a quantity of torsion of the rotary shaft, is caused between the output signals of the two magnetic sensors. With the following formula (3) can be found the relationship between the torsional angle $\theta$ of the rotary shaft and the phase difference $\Delta t$ measured in a unit of time between the output signals of the magnetic sensors;

$$\theta = 2\pi\Delta tN \qquad (3)$$

where N is the number of rotations for a unit time of the rotary shaft. The number of rotations can be obtained with the following formula (4) by using the measured values of frequencies f of the output signals of the magnetic sensors;

$$N = f/U \qquad (4)$$

where U is the number of magnetic poles on the magnetic scales and a known invariant. If the torsional angle $\theta$ of the rotary shaft is found with the formulas (3) and (4), the applied torque T can be obtained with the formula (2).

Referring to the conventional torque detector using two magnetic rotary encoders, however, there is a fundamental problem that the torque cannot be detected with high precision. A first factor of preventing the torque from being detected with high precision is that a circumferential positional shift is almost inevitably caused between the magnetic scales when they are fixed to the rotary shaft, or the circumferential positional shift is almost inevitably caused between the magnetic sensors when they are provided opposite to the magnetic scales respectively. While the rotary shaft is released from a load and is rotated with no torque, the offset of the phase difference is caused between the output signals of the magnetic sensors owing to the positional shift of the magnetic scales or magnetic sensors so that apparent torque is detected with no torsional deformation of the rotary shaft. In other words, the offset occurs on the detected torque. A second factor is the distortion which remains on the rotary shaft while the rotary shaft is loaded. When the distortion remains on the rotary shaft itself, the offset of the phase difference is caused between the output signals of the magnetic sensors owing to the residual distortion even if no torque is applied to the rotary shaft. Consequently, the offset occurs on the detected torque.

To eliminate the offset of the detected torque, a novel torque detector has been disclosed in Japanese Patent Application No. 1-254561 (Sep. 29, 1989) which was laid open as Japanese Unexamined Patent Publication No. 3-115940 (May 16, 1991). The torque detector comprises magnetic disks and non-movable magnetic heads for recording and reproducing. The magnetic disks are individually and coaxially fixed to the rotary shaft in two positions separated from each other by a distance L in the axial direction of the rotary shaft, and is rotated together with the rotary shaft. The non-movable magnetic heads are provided opposite to the magnetic faces of the magnetic disks.

Referring to the torque detector disclosed in the above-mentioned application, respective cyclic in-phase electric signals are provided as recording signals to the two magnetic heads while the rotary shaft is released from a load and is rotated with no torque in a preparatory step prior to the detection of the applied torque. The magnetic heads execute recording operation for converting the respective recording signals into the respective corresponding change of magnetic flux, i.e., magnetic signals. As a result, in-phase magnetic signals of the magnetic heads are recorded in the form of respective magnetizing patterns on the magnetic faces of the magnetic disks such that a lot of magnetic poles are arranged at a predetermined pitch over the entire periphery of the magnetic disks. Thus, two magnetic disks are respectively fixed to the rotary shaft and then the same magnetizing pattern for torque detection is simultaneously formed on the respective magnetic faces of the magnetic disks. Differently from the torque detector using two magnetic rotary encoders, therefore, it is not necessary to consider the circumferential positional shift between the magnetic disks when they are respectively fixed to the rotary shaft.

The magnetic heads also execute the reproducing operation for reading out the respective magnetizing patterns on the magnetic faces of the magnetic disks. Each magnetic head has the function of converting the change of magnetic flux into a cyclic electric signal and outputting the same. The change of magnetic flux is simultaneously caused by the magnetizing patterns on the magnetic faces while the rotary shaft is rotated. Each magnetic head is held in the same position at the time of reproducing and recording. Differently from the torque detector using two magnetic rotary encoders, therefore, the influence of the positional shift of the magnetic heads is set off between the recording and reproducing operation even if the circumferential positional shift of the magnetic disks is caused between the magnetic heads when they are provided opposite to the magnetic faces of the magnetic disks. In other words, the positional shift of the magnetic heads does not cause the offset of the phase difference between the output signals of the magnetic heads. In the case where the offset of the phase difference is caused between the output signals of the magnetic heads owing to the residual distortion of the rotary shaft with no torque applied thereto, the operation of the preparatory step is executed again to reform the magnetizing patterns on the magnetic faces of the magnetic disks. Consequently, the offset of the phase difference can be canceled between the output signals of the magnetic heads.

When the torsional deformation occurs on the rotary shaft owing to the torque, the phase difference, which is proportional to the quantity of torsion of the rotary shaft, is caused between the output signals of the magnetic heads. A torsional angle $\theta$ of the rotary shaft is found with the formula (3) based on the phase difference $\Delta t$ measured in a unit of time between the output signals of the magnetic heads. Differently from the torque detector using two magnetic rotary encoders, the number of magnetic poles formed on the magnetic faces of the magnetic disks is changed correspondingly to the number of rotations $N_0$ for a unit time of a non-load rotary shaft in the preparatory step and frequencies $f_0$ of the in-phase recording signals provided to the magnetic heads in the preparatory step. Consequently, it is necessary to obtain the number of rotations N for a unit time of the rotary shaft loaded in a torque detection step with the following formula (5) in place of the formula (4);

$$N=(f/f_0)N_0 \qquad (5)$$

where f is a measured value of the frequency of the output signal of either of the magnetic heads in the torque detection step. In the torque detection step, there are known the number of rotations $N_0$ of the rotary shaft in the preparatory step and the frequencies $f_0$ of the in-phase recording signals provided to the magnetic heads in the preparatory step. When the torsional angle $\theta$ of the rotary shaft is found with the formulas (3) and (5), the applied torque T can be obtained with the formula (2) in similar to the foregoing.

However, the torque detector using two sets of magnetic disks and magnetic heads has a problem to be solved. The problem is caused by the rotary shaft which is not always rotated at a constant speed. In general, the rotary shaft carried on a power transmission system of a car frequently changes its rotary speed. In the case where the number of rotations N for a unit time of the rotary shaft in the torque detection step is to be determined with the formula (5) and the number of rotations $N_0$ for a unit time of the rotary shaft in the preparatory step is actually varied, the pitch between the magnetic poles formed on the magnetic faces of the magnetic disks is varied even if the recording signals respectively having constant frequencies $f_0$ are provided to the magnetic heads in the preparatory step. The variation of the pitch between the magnetic poles overlaps that of the rotary speed of the rotary shaft in the torque detection step. Consequently, the frequencies f of the output signals of the magnetic heads in the torque detection step are greatly varied. Thus, the error of the number of rotations N for a unit time, which is obtained with the formula (5), is increased so that the error of the detected torque T is made greater.

It is an object of the present invention to provide a torque detector for detecting torque applied to a rotary shaft to be rotated wherein the influence of the positional shift of components of the torque detector and the influence of the residual distortion of the rotary shaft are eliminated and the influence of the variation of the rotary speed of the rotary shaft is reduced so that the torque can be detected with high precision. It is another object of the present invention to detect with high precision torque applied to a rotary shaft in a power transmission system of a car comprising a plurality of rotary shafts which are removably connected to one another.

SUMMARY OF THE INVENTION

To solve the above-mentioned objects, the present invention provides a torque detector for detecting torque applied to a rotary shaft to be rotated wherein first and second magnetic recording mediums are respectively fixed in two positions separated from each other by a predetermined distance in the axial direction of the rotary shaft and set on a peripheral face of the rotary shaft, a magnetizing pattern is preformed at a constant pitch solely on a magnetic face of the first magnetic recording medium and is copied onto a magnetic face of the second magnetic recording medium in a preparatory step prior to the detection of the applied torque. More specifically, the present invention provides a torque detector comprising first and second magnetic recording mediums, first and second magnetic heads, phase difference and rotary speed detection means and torque calculation means to be described below. The first magnetic recording medium has a magnetic face and a cyclic magnetizing pattern preformed at a constant pitch on the magnetic face, and is fixed onto the peripheral face of the rotary shaft and is rotated together with the rotary shaft. The second magnetic recording medium also has a magnetic face, and is fixed onto the peripheral face of the rotary shaft apart from the first magnetic recording medium by a predetermined distance in the axial direction of the rotary shaft and is rotated together with the rotary shaft. The first magnetic head is non-movably provided opposite to the magnetic face of the first magnetic recording medium for reading out the cyclic magnetizing pattern on the magnetic face of the first magnetic recording medium while the rotary shaft is rotated and outputting a cyclic electric signal corresponding to the cyclic magnetizing pattern as a first reproducing signal. The second magnetic head is non-movably provided opposite to the magnetic face of the second magnetic recording medium for receiving a recording signal in synchronous with the first reproducing signal outputted from the first magnetic head while the rotary shaft is rotated with no torque applied thereto and forming a magnetizing pattern corresponding to the recording signal on the magnetic face of the second magnetic recording medium, and for reading out the magnetizing pattern formed on the magnetic face of the second magnetic recording medium while the rotary shaft is rotated with torque applied thereto and outputting a cyclic electric signal corresponding to the magnetizing pattern as a second reproducing signal. The phase difference and rotary speed detection means receives the first and second reproducing signals which are simultaneously outputted from the first and second magnetic heads while the rotary shaft is rotated with torque applied thereto, and detects phase difference in a unit of time between the first and second reproducing signals and the number of rotations for a unit time of the rotary shaft based on one of the first and second reproducing signals. The torque calculation means calculates the torque applied to the rotary shaft based on the phase difference and the number of rotations detected by the phase difference and rotary speed detection means.

According to the present invention, the cycle magnetizing pattern preformed on the magnetic face of the first magnetic recording medium is read out with no torque applied to the rotary shaft, and then a magnetizing pattern corresponding to the above-mentioned cyclic magnetizing pattern by 1 to 1 is formed on the magnetic face of the second magnetic recording medium in the preparatory step prior to the detection of the applied torque. Differently from the torque detector using two magnetic rotary encoders, therefore, it is not necessary to consider the circumferential positional shift between the magnetic recording mediums when the two magnetic recording mediums are fixed onto the peripheral face of the rotary shaft. In addition, also in the case where the rotary speed of the rotary shaft is varied in the preparatory step, the pitch is made constant between the magnetic poles formed on the magnetic face of the second magnetic recording medium in similar to the first magnetic recording medium. Differently from the torque detector using two sets of magnetic disks and magnetic heads, the magnetizing patterns having a constant pitch respectively can always be prepared on the magnetic faces of the two magnetic recording mediums for torque detection whether the rotary speed of the rotary shaft is varied or not in the preparatory step.

In a torque detection step, the magnetizing patterns on the magnetic faces of the first and second magnetic recording mediums are respectively read out as the first and second reproducing signals by the first and second magnetic heads. Then, the phase difference is detected between the reproducing signals owing to the torsional deformation of the rotary shaft caused by the torque, and the number of rotations for a unit time of the rotary shaft is detected based on one of the reproducing signals. Thereafter, the applied torque is calculated based on the phase difference and the number of rotations for a unit time. In this case, even if the circumferential positional shift of the rotary shaft is caused between the magnetic heads, the positional shift of the magnetic heads does not cause the offset of the phase difference between the reproducing signals differently from the torque detector using two magnetic rotary encoders. In the case where the offset of the phase difference is caused between the reproducing signals owing to the residual distortion of the rotary shaft with no torque applied thereto, the operation of the preparatory step is executed again to recopy the magnetizing pattern on the magnetic face of the first magnetic recording medium onto that of the second magnetic recording medium. Consequently, it is possible to cancel the offset of the phase difference between the reproducing signals. Accordingly, the copying operation is periodically executed so that the offset of the phase difference between the reproducing signals can always be set to 0.

Furthermore, the magnetizing pattern is preformed at a constant pitch on the magnetic face of the first magnetic recording medium differently from the torque detector using two sets of magnetic disks and magnetic heads. Consequently, the frequencies of the reproducing signals in the torque detection step are not affected by the variation of the rotary speed of the rotary shaft in the preparatory step but in the torque detection step. In other words, the variation of the frequencies of the reproducing signals in the torque detection step is decreased as compared with the torque detector using two sets of magnetic disks and magnetic heads. Consequently, the number of rotations for a unit time of the rotary shaft can be obtained more precisely.

According to the present invention, there can be eliminated the influence of the positional shift of the two magnetic recording mediums, that of the two magnetic heads and the residual distortion of the rotary shaft. In addition, the influence of the variation of the rotary speed of the rotary shaft can be reduced so that the torque can be detected with high precision.

According to the above-mentioned invention, there is prepared the first magnetic recording medium including a magnetic face having a plurality of magnetic pattern layers formed at a constant pitch over the entire periphery of the rotary shaft such that the plurality of magnetic pattern layers are separated from one another and individually premagnetized. In this case, the magnetic pattern layers can be formed by a printing method, for example. The pitch of the magnetizing pattern on the magnetic face of the first magnetic recording medium having the magnetic pattern layers can precisely be obtained. The first and second magnetic recording mediums may have respective cylindrical magnetic faces continuously formed over the entire periphery of the rotary shaft. The cylindrical magnetic face of the first magnetic recording medium is solely cyclically premagnetized such that a plurality of magnetic poles are arranged at a constant pitch in the circumferential direction of the cylindrical magnetic face of the first magnetic recording medium.

Another invention provides a torque detector of a power transmission system of a car including a first rotary shaft to be rotated by power of an engine and a second rotary shaft removably connected to the first rotary shaft for transmitting the power of the engine, the torque detector being used for detecting torque applied to the second rotary shaft. The torque detector comprises first and second magnetic recording mediums, first and second magnetic heads, phase difference and rotary speed detection means and torque calculation means to be described below. The first magnetic recording medium has a magnetic face and a cyclic magnetizing pattern preformed at a constant pitch on the magnetic face, and is fixed onto a peripheral face of one of the first and second rotary shafts and is rotated together with the rotary shaft. The second magnetic recording medium has a magnetic face, and is fixed onto a peripheral face of the other rotary shaft and is rotated together with the rotary shaft. The first magnetic head is non-movably provided opposite to the magnetic face of the first magnetic recording medium for reading out the cyclic magnetizing pattern on the magnetic face of the first magnetic recording medium while the first and second rotary shafts are connected with each other and rotated and outputting a cyclic electric signal corresponding to the cyclic magnetizing pattern as a first reproducing signal. The second magnetic head is non-movably provided opposite to the magnetic face of the second magnetic recording medium for receiving a recording signal in synchronous with the first reproducing signal outputted from the first magnetic head while the first and second rotary shafts are connected with each other and rotated with the engine holding predetermined reference power and forming a magnetizing pattern corresponding to the recording signal on the magnetic face of the second magnetic recording medium, and for reading out the magnetizing pattern formed on the magnetic face of the second magnetic recording medium while the first and second rotary shafts are connected with each other and rotated with the engine holding power departing from the predetermined power and outputting a cyclic electric signal corresponding to the magnetizing pattern as a second reproducing signal. The phase difference and rotary speed detection means receives the first and second reproducing signal which are simultaneously outputted from the first and second magnetic heads while the first and second rotary shafts are connected with each other and rotated with engine holding the power departing from the predetermined reference power, and detects phase difference in a unit of time between the first and second reproducing signals and the number of rotations for a unit time of the second rotary shaft based on one of the first and second reproducing signals. The torque calculation means calculates the torque applied to the second rotary shaft with the engine holding the power departing from the predetermined reference power based on the phase difference and the number of rotations detected by the phase difference and rotary speed detection means.

In a preparatory step, the magnetizing pattern on the magnetic face of the first magnetic recording medium is read out while the first and second rotary shafts are rotated with the engine holding the predetermined reference power, and then a magnetizing pattern corresponding to the above-mentioned cyclic magnetizing pattern by 1 to 1 is formed on the magnetic face of the second magnetic recording medium. In a torque detection step, the magnetizing patterns on the magnetic faces of the first and second magnetic recording mediums are read out as the first and second reproducing signals by the first and second magnetic heads while the first and second rotary shafts are rotated with the engine holding the power departing from the predetermined reference power. Then, there are detected the phase difference between the reproducing signals owing to the torsional deformation of the second rotary shaft caused by the torque, and the number of rotations for a unit time of the second rotary shaft based on one of the reproducing signals. Thereafter, the torque applied to the second rotary shaft is calculated based on the phase difference and the number of rotations.

If the present invention is applied to the power transmission system of a car as described above, the magnetic recording mediums are fixed to the first and second rotary shafts connected to each other so that the torque variation of the whole power transmission system can be obtained. In addition, the first and second magnetic heads can be provided in any position in the circumferential direction of the rotary shafts. Every time the first and second rotary shafts are connected to each other, the operation of the preparatory step is executed to update the magnetizing pattern on the magnetic face of the second magnetic recording medium each time. Consequently, it is possible to eliminate torque detection errors which may occur every time the connection and disconnection of the engine power are repeated.

Referring to yet another invention, rotary speed detection means for detecting only the number of rotations for a unit time of a rotary shaft is provided. More specifically, the present invention provides a torque detector for detecting torque applied to the rotary shaft to be rotated, comprising first and second magnetic recording mediums, first and second magnetic heads, phase difference detection means, rotary speed detection means and torque calculation means. The first and second magnetic recording mediums have respective magnetic faces, and are fixed onto a peripheral face of the rotary shaft apart from each other by a predetermined distance in the axial direction of the rotary shaft and are rotated together with the rotary shaft. The first and second magnetic heads are non-movably provided opposite to the magnetic faces of the first and second magnetic recording mediums respectively for receiving a common recording signal while the rotary shaft is rotated with no torque applied thereto and forming respective identical magnetizing patterns corresponding to the common recording signal on the magnetic faces of the first and second magnetic recording mediums. In addition, the first and second magnetic heads read out the respective magnetizing patterns formed on the magnetic faces of the first and second magnetic recording mediums while the rotary shaft is rotated with torque applied thereto, and output respective cyclic electric signals corresponding to the respective magnetizing patterns as first and second reproducing signals. The phase difference detection means receives the first and second reproducing signals which are simultaneously outputted from the first and second magnetic heads while the rotary shaft is rotated with torque applied thereto, and then detects phase difference in a unit of time between the first and second reproducing signals. The rotary speed detection means includes conversion means and a rotary speed detector. The conversion means generates a pulse train having a constant frequency which is proportional to a constant rotary speed of the rotary shaft. The rotary speed detector detects the number of rotations for a unit time of the rotary shaft based on the pulse train provided from the conversion means while the phase difference detection means receives the first and second reproducing signals having the phase difference. The torque calculation means calculates the torque applied to the rotary shaft based on the phase difference detected by the phase difference detection means and the number of rotations detected by the rotary speed detection means.

According to the present invention, the same magnetizing pattern is formed on the magnetic faces of the first and second magnetic recording mediums based on a recording signal with no torque applied to the rotary shaft in a preparatory step prior to the detection of the applied torque. The magnetizing patterns on the magnetic faces of the magnetic recording mediums are read out with no torque applied to the rotary shaft so that the first and second reproducing signals are obtained. The reproducing signals are completely in-phase. In this case, even if the circumferential positional shift of the rotary shaft is caused between the magnetic heads, the positional shift of the magnetic heads does not cause the offset of the phase difference between the reproducing signals differently from the torque detector using two magnetic rotary encoders. In addition, it is not necessary to consider the circumferential positional shift between the first and second magnetic recording mediums when they are individually fixed onto the peripheral face of the rotary shaft. In the case where the offset of the phase difference is caused between the reproducing signals owing to the residual distortion of the rotary shaft with no torque applied thereto, the operation of the preparatory step is executed again to reform the magnetizing patterns on the magnetic faces of the first and second magnetic recording mediums. Consequently, it is possible to cancel the offset of the phase difference between the reproducing signals. Accordingly, the copying operation is periodically executed so that the offset of the phase difference between the reproducing signals can always be set to 0. In a torque detection step, the magnetizing patterns on the magnetic faces of the first and second magnetic recording mediums are read out as the first and second reproducing signals by the first and second magnetic heads. Consequently, there can precisely be detected the phase difference between the reproducing signals owing to the torsional deformation of the rotary shaft caused by the torque.

In the case where the torsional angle of the rotary shaft is to be calculated, the number of rotations for a unit time of the rotary shaft, which is needed together with the phase difference, is not obtained by the first and second reproducing signals based on the magnetizing patterns on the magnetic faces of the first and second magnetic recording mediums but by rotary speed detection means differently from the torque detector using two sets of magnetic disks and magnetic heads. The rotary speed detection means includes conversion means and a rotary speed detector. The conversion means generates a pulse train having a constant frequency which are proportional to the rotary speed of the rotary shaft when it is rotated at a constant speed. The rotary speed detector detects the number of rotations for a unit time of the rotary shaft based on the pulse train provided from the conversion means. Accordingly, the frequency of the pulse signal outputted from the conversion means in the torque detection step is not affected by the variation of the rotary speed of the rotary shaft in the preparatory step but in the torque detection step. In other words, the number of rotations for a unit time of the rotary shaft can be obtained more precisely in the torque detection step as compared with the torque detector using two sets of magnetic disks and magnetic heads.

As described above, the applied torque is calculated based on the phase difference and the number of rotations which are obtained with high precision. Consequently, there can be eliminated the influence of the positional shift of the two magnetic recording mediums, the positional shift of the two magnetic heads and the residual distortion of the rotary shaft. In addition, there can be reduced the influence of the variation of the rotary speed of the rotary shaft. Consequently, the torque can be detected with high precision.

Referring to the above-mentioned invention, it is preferred that two magnetic recording mediums having respective cylindrical magnetic faces, which are continuously formed over the entire periphery of the rotary shaft, are used for the first and second magnetic recording mediums. The conversion means includes a gear and an electromagnetic pickup. The gear has a plurality of teeth formed at a constant pitch over the whole outer peripheral face, and is coaxially fixed to the rotary shaft and is rotated together with the rotary shaft. The electromagnetic pickup is non-movably provided such that the teeth of the gear sequentially pass through its vicinity while the rotary shaft is rotated, and generates the pulse train such that one pulse is outputted every time each of the teeth of the gear passes through its vicinity. The conversion means may include a slit plate and an optical pickup. The slit plate has a plurality of slits formed at a constant pitch over the entire periphery in a circumferential direction, and is coaxially fixed to the rotary shaft and is rotated together with the rotary shaft. The optical pickup has a light emitting element and a light receiving element which are non-movably provided opposite to each other through the slit plate. In this case, the light receiving element generates the pulse train such that one pulse is outputted every time light emitted from the light emitting element passes through each of the plurality of slits of the slit plate so as to reach the light receiving element while the rotary shaft is rotated. The conversion means may include a third magnetic recording medium and a third magnetic head. The third magnetic recording medium has a cylindrical magnetic face continuously formed over the entire periphery of the rotary shaft and a cyclic magnetizing pattern preformed on the cylindrical magnetic face of the third magnetic recording medium such that a plurality of magnetic poles are arranged at a constant pitch in a circumferential direction of the cylindrical magnetic face of the third magnetic recording medium. The third magnetic head is non-movably provided opposite to the magnetic face of the third magnetic recording medium for reading out the cyclic magnetizing pattern on the magnetic face of the third magnetic recording medium while the rotary shaft is rotated and outputting a cyclic electric signal corresponding to the cyclic magnetizing pattern as the pulse train.

These and other objects, features and advantages of the present invention will become more apparent upon a reading of the following detailed description and drawings.

DETAILED DESCRIPTION OF PREFERRED EMBODIMENTS

Preferred embodiments of the present invention will be described in more detail with reference to the drawings.

Figure 1:
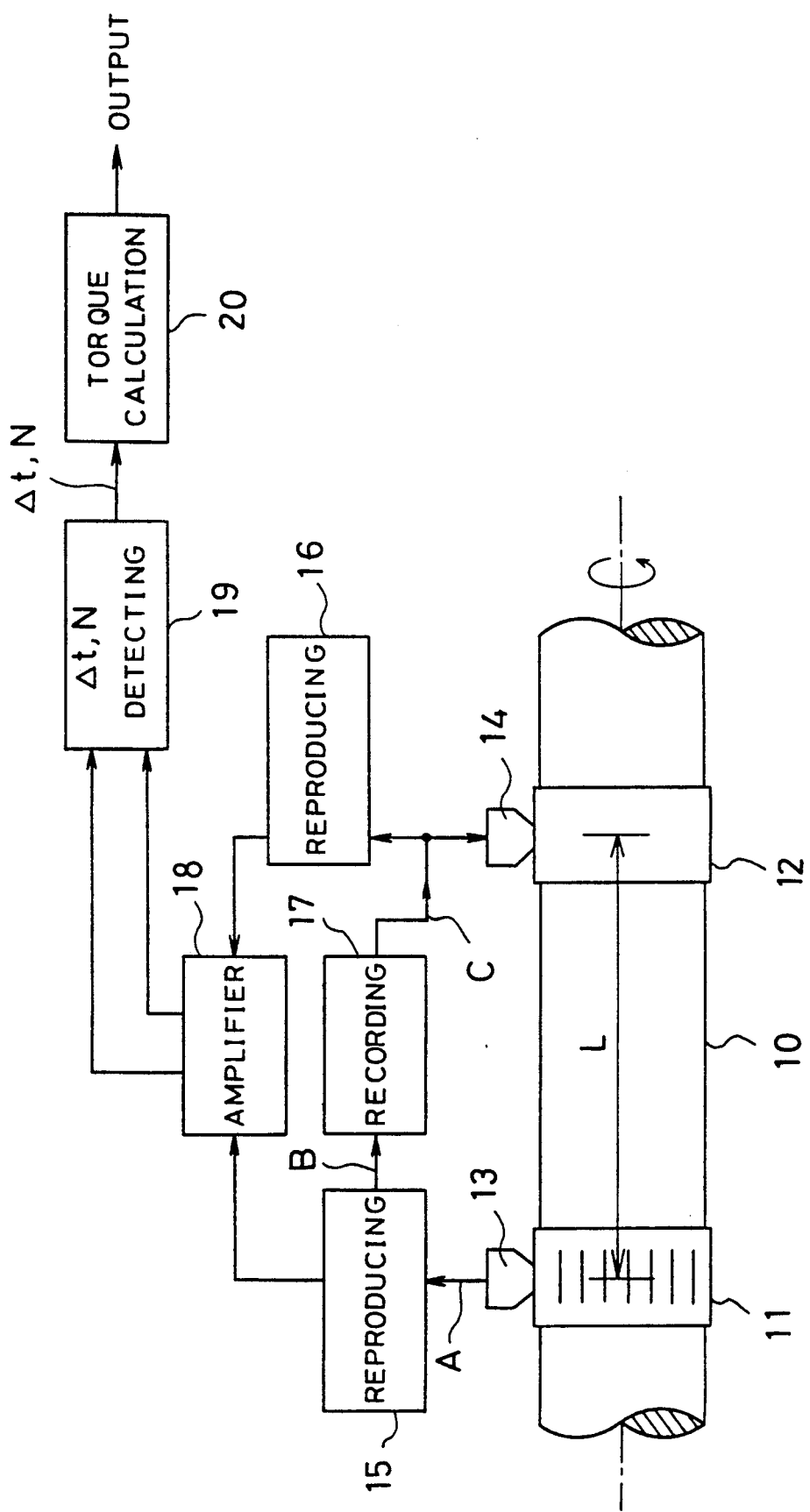
FIG. 1 is a view showing the structure of a torque detector according to an embodiment of the present invention.
Figure 2:
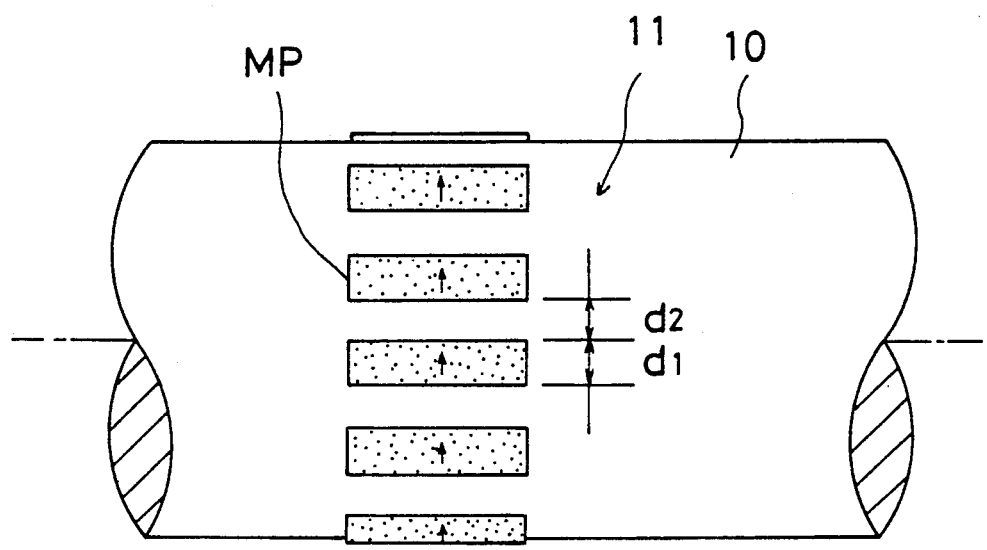
FIG. 2 is a view showing the specific structure of a first magnetic recording layer of the torque detector shown in FIG. 1.

FIG. 1 is a view showing the structure of a torque detector according to an embodiment of the present invention. FIG. 2 is a view showing the specific structure of a first magnetic recording layer 11 shown in FIG. 1. In FIG. 1, a rotary shaft 10 is an output shaft of a transmission for a car, for example. The rotary shaft 10 has its left end connected to a driving source and its right end connected to a load. The torque detector has the function of detecting torque applied to the rotary shaft 10. First and second magnetic recording layers 11 and 12 are formed on the entire periphery of the rotary shaft 10 apart from each other by a distance L in the axial direction of the rotary shaft 10.

As enlarged in FIG. 2, a lot of magnetic pattern layers MP, which are separated from one another, are formed on the entire periphery of the rotary shaft 10 by printing a predetermined portion of the peripheral face of the rotary shaft 10 by means of magnetic ink. The magnetic ink is prepared by dispersing magnetic powder such as ferrite into an epoxy resin binder or the like. Thus, the first magnetic recording layer 11 is formed. Referring to the present embodiment, a circumferential width d1 of the magnetic pattern layer MP and a space d2 between two adjacent magnetic pattern layers are 200 μm. The magnetic pattern layers MP are premagnetized in the same direction as shown by arrows in FIG. 2. In other words, at a pitch of 400 μm over the entire periphery of the rotary shaft 10 is formed a magnetizing pattern in which the magnetic pattern layers MP and unmagnetized regions between the two adjacent magnetic pattern layers are alternately repeated. Thus, a lot of magnetic pattern layers MP are formed by a printing method. Consequently, the pitch of the magnetizing pattern on the first magnetic recording layer 11 having the magnetic pattern layers MP becomes accurate according to the precision of a mask plate used for printing. There can be adopted a film forming method capable of masking such as a vacuum film forming method in place of the printing method. The magnetic pattern layers MP may be formed as follows. First, a continuous cylindrical magnetic face is formed over the entire periphery of the rotary shaft 10 by using a coating method, a plating method or the like depending on the material of the first magnetic recording layer 11. Then, the magnetic pattern layers MP are formed on the magnetic face by using a machining method such as laser beam machining or etching. The continuous cylindrical magnetic face is formed on the entire periphery of the rotary shaft 10. The magnetic face is premagnetized with a predetermined pattern such that a lot of magnetic poles are arranged at a constant pitch over its entire periphery in similar to the magnetic scale of the magnetic rotary encoder. Thus, the first magnetic recording layer 11 can be formed.

The second magnetic recording layer 12 is also formed by the same method as the first magnetic recording layer 11. However, the second magnetic recording layer 12 is formed like a continuous cylinder over the entire periphery of the rotary shaft 10. In addition, the cylindrical magnetic face is not premagnetized.

First and second induction type magnetic heads 13 and 14 are non-movably provided close and opposite to the magnetic faces of the first and second magnetic recording layers 11 and 12. The first magnetic head 13 is only for reproducing which converts the change of magnetic flux into a cyclic electric signal and outputs the same. The change of magnetic flux is caused by the magnetizing pattern on the magnetic face of the first magnetic recording layer 11 while the rotary shaft 10 is rotated. The second magnetic head 14 is a magnetic head to execute recording and reproducing operation. In the recording operation, a cyclic electric signal provided as a recording signal is converted into the corresponding change of magnetic flux, i.e., a magnetic signal so as to form a magnetizing pattern on the cylindrical magnetic face of the second magnetic recording layer 12. In the reproducing operation, the change of magnetic flux is converted into a cyclic electric signal to be outputted. The change of magnetic flux is caused by the magnetizing pattern on the magnetic face of the second magnetic recording layer 12 while the rotary shaft 10 is rotated. The same head, which can perform recording and reproducing, may be used for the magnetic heads 13 and 14. It is sufficient that the first magnetic head 13 executes only the reproducing operation.

A first reproducing circuit 15 is a circuit for shaping a waveform on an output signal A of the first magnetic head 13 so as to obtain a first reproducing signal B. The first reproducing signal B is provided to a recording circuit 17 and an amplifier 18. The recording circuit 17 generates a recording signal C in synchronous with the first reproducing signal B provided from the first reproducing circuit 15, and outputs the same to the second magnetic head 14. A second reproducing circuit 16 is a circuit for shaping a waveform on the output signal of the second magnetic head 14 so as to obtain a second reproducing signal. The second reproducing signal is provided to only the amplifier 18. The amplifier 18 amplifies the reproducing signals from the first and second reproducing circuits 15 and 16, and outputs the amplified reproducing signals to a phase difference and rotary speed detecting circuit 19. The phase difference and rotary speed detecting circuit 19 detects a phase difference Δt in a unit of time between the amplified reproducing signals, and the number of rotations N for a unit time of the rotary shaft 10 based on one of the amplified reproducing signals. A torque calculation circuit 20 calculates the torque T applied to the rotary shaft 10 based on the phase difference Δt and the number of rotations N obtained by the phase difference and rotary speed detecting circuit 19, and outputs the result of calculation as a torque detection value.

There will be described the operation of the torque detector according to the present embodiment. The operation comprises a preparatory step and a torque detection step. In the preparatory step, the magnetizing pattern on the magnetic face of the first magnetic recording layer 11 is read out prior to the detection of the applied torque, and a magnetizing pattern corresponding to the magnetizing pattern on the magnetic face of the first magnetic recording layer is formed on the magnetic face of the second magnetic recording layer 12. In the torque detection step, the magnetizing patterns on the magnetic faces of the magnetic recording layers 11 and 12 are simultaneously read out.

Figure 3:
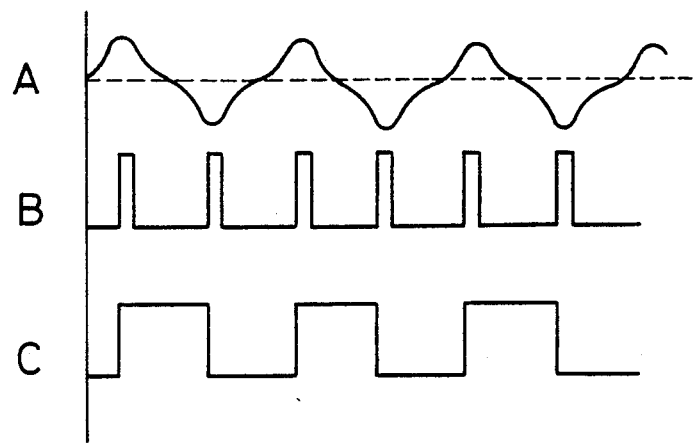
FIG. 3 is a signal waveform diagram of each portion of the torque detector shown in FIG. 1.

The preparatory step is carried out as follows while the rotary shaft 10 is released from a load and is rotated with no torque. First, the magnetizing pattern preformed on the magnetic face of the first magnetic recording layer 11 is converted into an electric signal by the first magnetic head 13. As shown in the upper part of FIG. 3, the output signal A of the first magnetic head 13 is converted into a cyclic signal corresponding to the magnetizing pattern having a pitch of 400 μm of the first magnetic recording layer 11 in which the magnetic pattern layers MP and the unmagnetized regions between the two adjacent magnetic pattern layers are alternately repeated. The first reproducing circuit 15 shapes a waveform on the output signal A of the first magnetic head 13, generates a pulse train in synchronous with the output signal A as shown in the middle part of FIG. 3, and outputs the same as the first reproducing signal B to the recording circuit 17. The recording circuit 17 generates a rectangular wave signal which is synchronous with the first reproducing signal B and has a duty ratio of about 1, and outputs the same as the recording signal C to the second magnetic head 14 as shown in the lower part of FIG. 3. Accordingly, the recording signal C provided to the second magnetic head 14 is a signal which is synchronous with the output signal A of the first magnetic head 13. The second magnetic head 14 converts the recording signal C into the corresponding change of magnetic flux, i.e., a magnetic signal. Thus, the second magnetic head 14 forms a magnetizing pattern corresponding to the magnetizing pattern on the magnetic face of the first magnetic recording layer 11 by 1 to 1 over the entire periphery of the magnetic face of the second magnetic recording layer 12.

In the preparatory step, it is important that the magnetizing pattern on the magnetic face of the first magnetic recording layer 11 is read out while the rotary shaft 10 is rotated with no loads, and the corresponding magnetizing pattern by 1 to 1 is formed on the magnetic face of the second magnetic recording layer 12. In other words, the magnetizing pattern preformed on the magnetic face of the first magnetic recording layer 11 is copied onto the magnetic face of the second magnetic recording layer 12 with the rotary shaft 10 unloaded. Differently from the torque detector using two magnetic rotary encoders, therefore, it is not necessary to consider the circumferential positional shift between the magnetic recording layers 11 and 12 when they are formed on the rotary shaft 10. In addition, the variation of the number of rotations $N_0$ for a unit time of the rotary shaft 10 in the preparatory step is set off between the magnetic recording layers 11 and 12. In other words, even if the number of rotations $N_0$ is varied, the pitch between the magnetic poles formed on the magnetic face of the second magnetic recording layer 12 has a constant value of 400 μm in similar to the first magnetic recording layer 11. More specifically, it is possible to always prepare magnetizing patterns having a constant pitch on the magnetic faces of the first and second magnetic recording layers 11 and 12 for torque detection whether the rotary speed of the rotary shaft 10 is varied or not in the preparatory step, differently from the torque detector using two sets of magnetic disks and magnetic heads.

Also in the case where the magnetizing pattern on the magnetic face of the second magnetic recording layer 12 is to be read out, the second magnetic head 14 is used. The first and second magnetic heads 13 and 14 convert the change of magnetic flux into a cyclic electric signal, respectively. The change of magnetic flux is simultaneously caused by the magnetizing patterns on the magnetic faces of the first and second magnetic recording layers 11 and 12 while the rotary shaft 10 is rotated. In this case, even if the circumferential positional shift of the rotary shaft 10 is caused between the magnetic heads 13 and 14 when they are provided opposite to the first and second magnetic recording layers 11 and 12, the influence of the positional shift of the magnetic heads is set off between the recording and reproducing operation. Differently from the torque detector using two magnetic rotary encoders, the positional shift of the magnetic heads does not cause the offset of the phase difference between the output signals of the magnetic heads 13 and 14. In the case where the offset of the phase difference is caused between the output signals of the magnetic heads 13 and 14 owing to the residual distortion of the rotary shaft 10 with no torque applied thereto, the operation of the preparatory step is executed again to recopy the magnetizing pattern on the magnetic face of the first magnetic recording layer 11 onto that of the second magnetic recording layer 12. Consequently, it is possible to cancel the offset of the phase difference between the output signals of the magnetic heads 13 and 14. Accordingly, the copying operation is periodically executed so that the offset of the phase difference between the output signals of the magnetic heads 13 and 14 can always be set to 0.

There will be described a torque detection step in the latter part. When the torsional deformation occurs on the rotary shaft 10 owing to the torque caused by a load, the phase difference, which is proportional to a quantity of torsion of the rotary shaft 10, is caused between the output signals of the first and second magnetic heads 13 and 14. The output signal of the first magnetic head 13 corresponding to the magnetizing pattern on the magnetic face of the first magnetic recording layer 11 is subjected to waveform shaping by the first reproducing circuit 15, and then is provided to the amplifier 18. On the other hand, the output signal of the second magnetic head 14 corresponding to the magnetizing pattern on the magnetic face of the second magnetic recording layer 12 is subjected to waveform shaping by the second reproducing circuit 16, and then is provided to the amplifier 18. The amplifier 18 amplifies the input signals and outputs the amplified input signals to the phase difference and rotary speed detecting circuit 19.

The phase difference and rotary speed detecting circuit 19 detects the phase difference $\Delta t$ is a unit of time between the input signals provided from the amplifier 18. As described above, the offset of the phase difference $\Delta t$ is canceled differently from the torque detector using two rotary encoders. In addition, the phase difference and rotary speed detecting circuit 19 calculates the number of rotations N for a unit time of the rotary shaft 10 based on the measured value of a frequency f of the input signal on the first magnetic head 13 side with the following formula (6):

$$N = f/V \tag{6}$$

where V is the number of magnetic poles on the magnetic face of the first magnetic recording layer 11. As described above, the magnetizing pattern is preformed at a constant pitch on the magnetic face of the first magnetic recording layer 11 differently from the torque detector using two sets of magnetic disks and magnetic heads. Consequently, the number of magnetic poles V on the magnetic face of the first magnetic recording layer 11 is an invariant which is not affected by the variation of the number of rotations $N_0$ for a unit time of the rotary shaft 10 in the preparatory step. The frequency f of the input signal on the first magnetic head 13 side is affected by only the variation of the rotary speed of the rotary shaft 10 in the torque detection step. In other words, the variation of the frequency f in the torque detection step is reduced as compared with the torque detector using two sets of magnetic disks and magnetic heads. The number of rotations N for a unit time can be obtained more precisely with the formula (6). In the preparatory step, the same number of magnetic poles are formed with the same pattern on the magnetic face of the second magnetic recording layer 12 in similar to that of the first magnetic recording layer 11. Consequently, the number of rotations N for a unit time of the rotary shaft 10 may be obtained with the formula (6) by using the measured value of the frequency of the input signal on the second magnetic head 14 side. The frequency of the input signal on the second magnetic head 14 side corresponds to the frequency f of the input signal on the first magnetic head 13 side.

The torque calculation circuit 20 calculates a torsional angle $\theta$ of the rotary shaft 10 with the formula (3) based on the phase difference $\Delta t$ and the number of rotations N provided from the phase difference and rotary speed detecting circuit 19. The torque T applied to the rotary shaft 10 is calculated with the formula (2) based on the torsional angle $\theta$. The result of calculation is outputted as a torque detection value. The applied torque T may directly be obtained by the phase difference $\Delta t$ and the number of rotations N with the following formula (7) without calculating the torsional angle $\theta$ of the rotary shaft 10. The formula (7) is obtained by erasing the torsional angle $\theta$ from the formulas (2) and (3).

$$T = \pi^2 G d^4 \Delta t N / 16L \tag{7}$$

Figure 4:
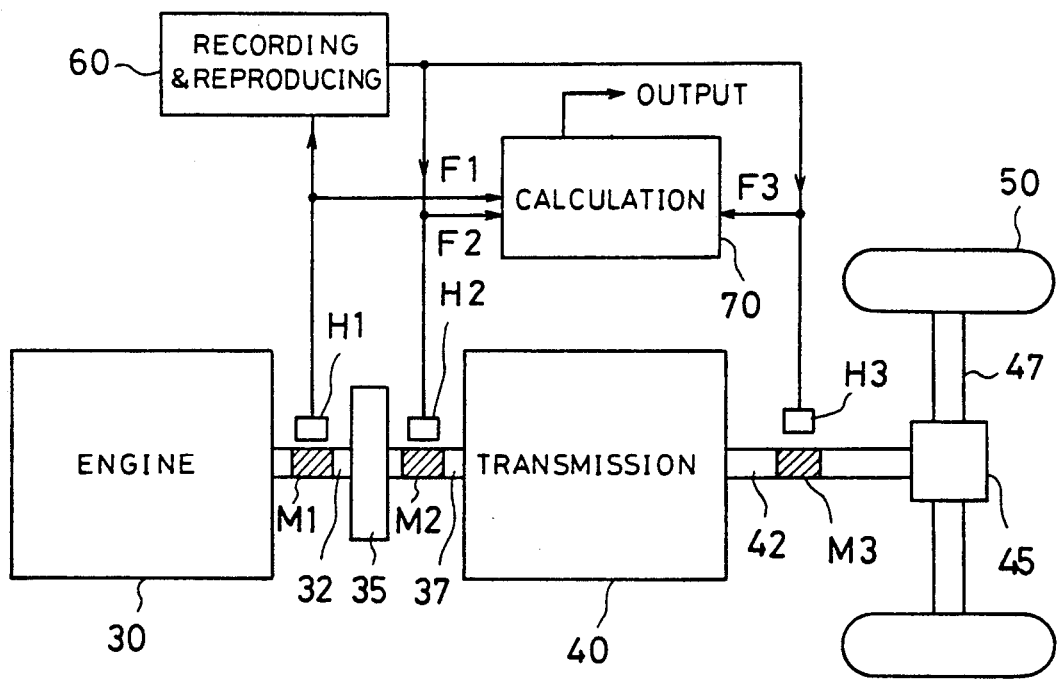
FIG. 4 is a view showing the structure of a torque detector according to another embodiment of the present invention, the torque detector being applied to a power transmission system of a car.

There will be described an example in which the torque detector of the present invention is applied to a power transmission system of a car. FIG. 4 is a view showing the structure of a torque detector according to another embodiment of the present invention, the torque detector being applied to the power transmission system of the car. In FIG. 4, the power of an engine 30 is outputted to a first rotary shaft 32, and is transmitted to a second rotary shaft 37 through a clutch 35. The second rotary shaft 37 is an input shaft of a transmission 40. The power is transmitted to a differential gear 45 through a third rotary shaft 42 as an output shaft of the transmission 40, and then is transmitted to a wheel 50 through an axle 47. As shown by hatching in FIG. 4, first to third magnetic recording layers M1, M2 and M3 are respectively formed on the first to third rotary shafts 32, 37 and 42. First to third magnetic heads H1, H2 and H3 are non-movably provided opposite to the first to third magnetic recording layers M1, M2 and M3, respectively. A magnetizing pattern is preformed at a constant pitch on the magnetic face of the first magnetic recording layer M1 in similar to the first magnetic recording layer 11 shown in FIG. 2.

First, the clutch 35 and the transmission 40 are individually and internally connected, so that the first and second rotary shafts 32 and 37 are connected to each other and the second and third rotary shafts 37 and 42 are connected to each other. Then, the output of the engine 30 is set to some predetermined reference power through conditions such as the rotary speed of an engine, the throttle opening, intake air flow and the like. A preparatory step is started as follows. First, a recording and reproducing circuit 60 reads out the magnetizing pattern on the magnetic face of the first magnetic recording layer M1 through the first magnetic head H1. The first magnetic head H1 outputs a reproducing signal corresponding to the magnetizing pattern on the magnetic face of the first magnetic recording layer M1. The recording and reproducing circuit 60 generates a recording signal in synchronous with the reproducing signal, and outputs the same to the second and third magnetic heads H2 and H3. Thus, a magnetizing pattern corresponding to the magnetizing pattern on the magnetic face of the first magnetic recording layer M1 is formed at a constant pitch on the magnetic faces of the second and third magnetic recording layers M2 and M3. The frequency of the recording signal provided to the third magnetic head H3 is actually adjusted by the recording and reproducing circuit 60 in accordance with the gear ratio of the transmission 40. The gear ratio is set to 1:1 for simplification in the following description.

Figure 5:
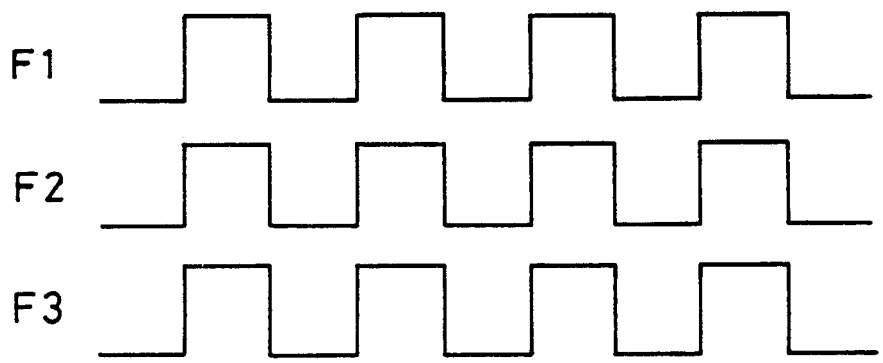
FIG. 5 is a signal waveform diagram of each portion of the torque detector shown in FIG. 4 in the case where an engine holds the predetermined reference power.
Figure 6:
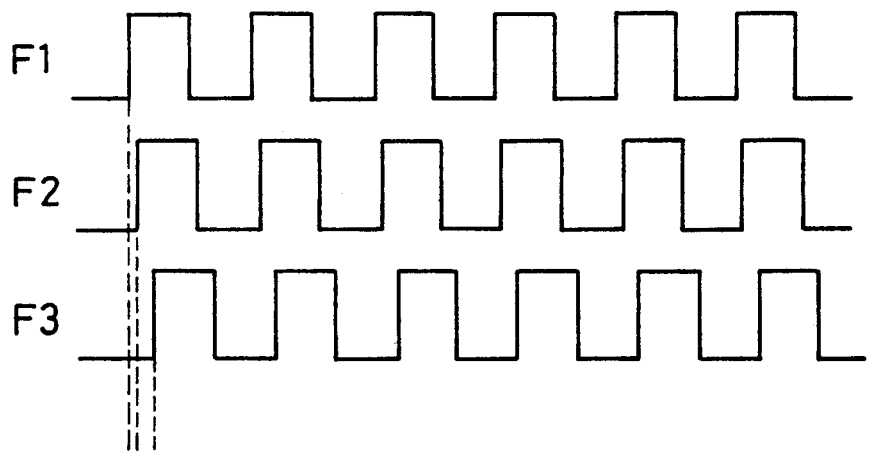
FIG. 6 is a signal waveform diagram of each portion of the torque detector shown in FIG. 4 in the case where the engine holding the power departs from the predetermined reference power.

In a torque detection step, reproducing signals F1, F2 and F3 of the magnetic heads H1, H2 and H3 are provided to a calculation circuit 70, respectively. While the engine 30 holds the predetermined reference power, the torques applied to the rotary shafts 32, 37 and 42 are the same as in the preparatory step. Consequently, the reproducing signals F1, F2 and F3 completely correspond to one another in phase as shown in FIG. 5. When the power of the engine 30 departs from the predetermined reference power, the torque applied to the respective rotary shafts 32, 37 and 42 is made different from that in the preparatory step. Consequently, the phase difference is caused among the reproducing signals F1, F2 and F3 as shown in FIG. 6. The calculation circuit 70 can calculate the torque applied to the second and third rotary shafts 37 and 42 by the phase difference among the reproducing signals F1, F2 and F3 and the number of rotations for a unit time of the second and third rotary shafts 37 and 42 based on the above-mentioned principle.

If the present invention is applied to the power transmission system of the car as described above, the variation of the torque over the whole power transmission system can be grasped only by forming the magnetic recording layers M1, M2 and M3 on the rotary shafts 32, 37 and 42. Consequently, the whole system can smoothly be controlled. Every time the clutch 35 and the transmission 40 are individually and internally connected, the operation of the preparatory step is executed to update the magnetizing patterns on the magnetic faces of the second and third magnetic recording layers M2 and M3 each time. As a result, there can be eliminated the phase shift caused by repeating the connection and disconnection of the power, and torque detection errors based on the backlash between gears or the like. The first to third magnetic heads H1, H2 and H3 can be provided in any position in the circumferential direction of the rotary shafts 32, 37 and 42.

Figure 7:
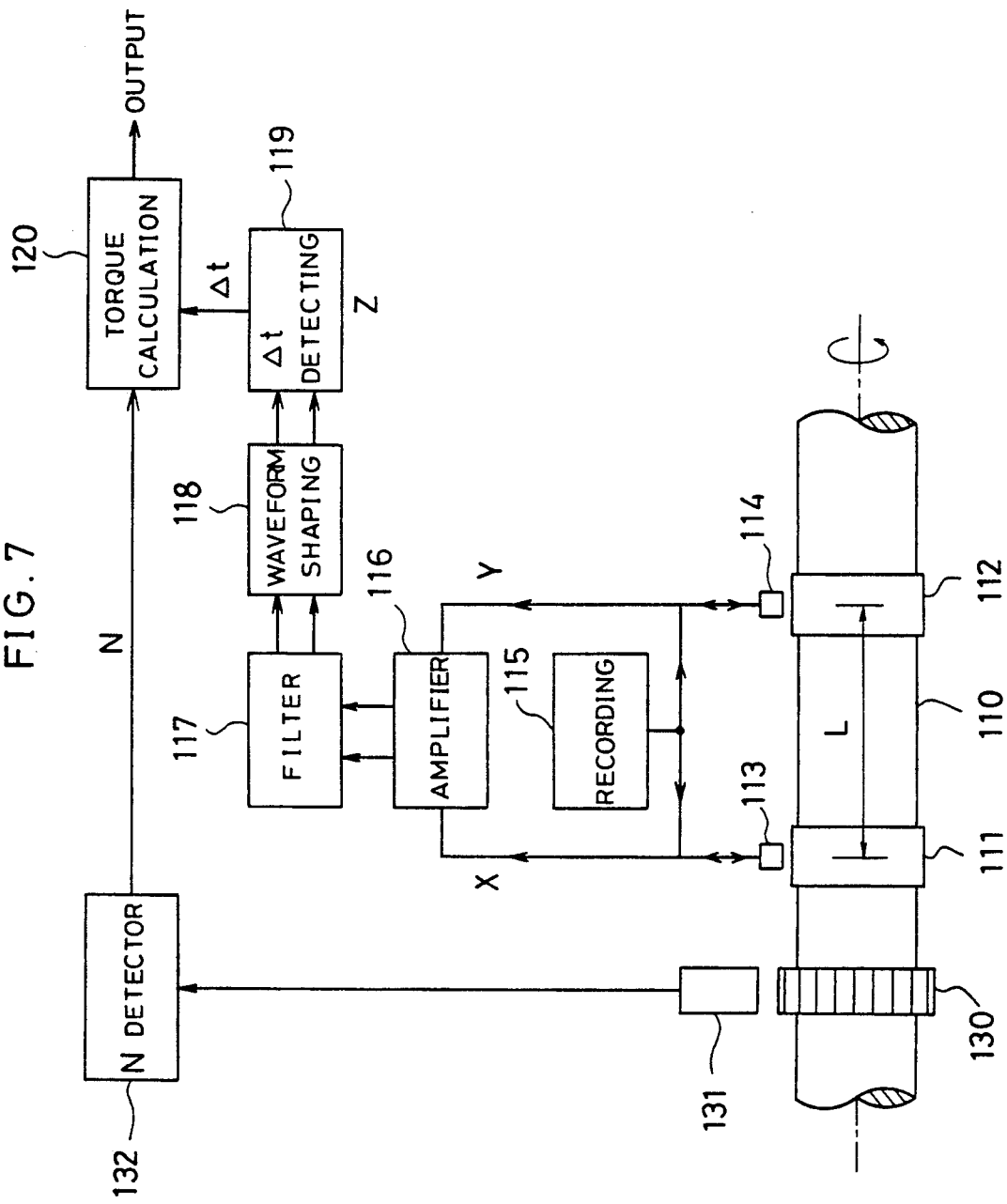
FIG. 7 is a view showing the structure of a torque detector according to yet another embodiment of the present invention.

FIG. 7 is a view showing the structure of a torque detector according to yet another embodiment of the present invention. Referring to the present embodiment, first and second magnetic recording layers 111 and 112 are formed apart from each other by a distance L in the axial direction of a rotary shaft 110. In addition, the first and second magnetic recording layers 111 and 112 have continuous cylindrical magnetic faces over the entire periphery of the rotary shaft 110, respectively. It is not necessary to premagnetize the magnetic recording layers 111 and 112. The magnetic faces of the magnetic recording layers 111 and 112 can be formed by coating magnetic paint in predetermined portions on the peripheral face of the rotary shaft 110, respectively. The magnetic paint is prepared by dispersing magnetic powder such as ferrite in an epoxy resin binder or the like.

First and second induction type magnetic heads 113 and 114 for recording and reproducing are non-movably provided close and opposite to the magnetic faces of the first and second magnetic recording layers 111 and 112. A recording circuit 115 outputs a recording signal to the magnetic heads 113 and 114 so as to form predetermined magnetizing patterns on the magnetic faces of the magnetic recording layers 111 and 112. First and second reproducing signals X and Y are provided to a phase difference detecting circuit 119 through an amplifier 116, a filter 117 and a waveform shaping circuit 118. The first reproducing signal X is outputted from the first magnetic head 113 correspondingly to the magnetizing pattern on the magnetic face of the first magnetic recording layer 111 at the time of reproducing. The second reproducing signal Y is outputted from the second magnetic head 114 correspondingly to the magnetizing pattern on the magnetic face of the second magnetic recording layer 112 at the time of reproducing. The phase difference detecting circuit 119 internally generates a phase difference signal Z having a pulse width which is equal to a phase difference $\Delta t$ between two input signals obtained by processing the first and second reproducing signals X and Y. In addition, the phase difference detecting circuit 119 measures the pulse width of the phase difference signal Z so as to detect the phase difference $\Delta t$ in a unit of time and to output the same to a torque calculation circuit 120.

In order to detect the number of rotations N for a unit time of the rotary shaft 110, a gear 130 is coaxially fixed to the rotary shaft 110. The gear 130 has a lot of teeth formed at a constant pitch on its outer periphery. An electromagnetic pickup 131 is non-movably provided close and opposite to the teeth of the gear 130. The electromagnetic pickup 131 converts the passage of the teeth of the gear 130 into a pulse train. The pulse train is provided to a rotary speed detector 132. The rotary speed detector 132 detects the number of rotations N for a unit time of the rotary shaft 110 based on the pulse train provided from the electromagnetic pickup 131, and outputs the same to the torque calculation circuit 120. The torque calculation circuit 120 calculates the torque T applied to the rotary shaft 110 based on the phase difference $\Delta t$ provided from the phase difference detecting circuit 119 and the number of rotations N provided from the rotary speed detector 132. The result of calculation is outputted as a torque detection value.

There will be described the operation of the torque detector according to the present embodiment. The operation comprises a preparatory step and a torque detection step. In the preparatory step, the same magnetizing pattern is formed on the magnetic faces of the first and second magnetic recording layers 111 and 112 prior to the detection of the applied torque. In the torque detection step, the magnetizing patterns on the magnetic faces of the magnetic recording layers 111 and 112 are simultaneously read out.

The preparatory step is carried out as follows while the rotary shaft 110 is released from a load and is rotated with no torque. First, the recording circuit 115 generates a pulse signal having a constant frequency $f_0$. The pulse signal is provided as a common recording signal to the first and second magnetic heads 113 and 114. The magnetic heads 113 and 114 convert the recording signals into the corresponding pulse-shaped change of magnetic flux, i.e., magnetic pulse signals. Thus, the same pulse-shaped magnetizing pattern is formed over the entire periphery of the magnetic faces of the magnetic recording layers 111 and 112 by the magnetic heads 113 and 114.

Figure 8:
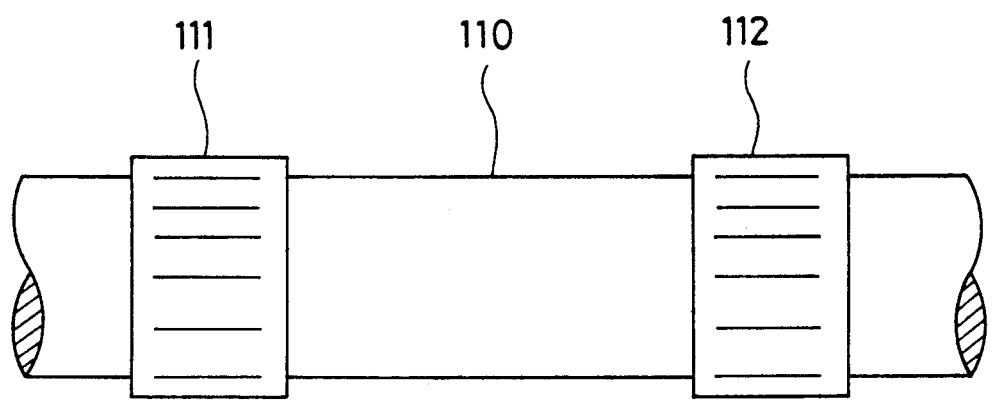
FIG. 8 is a view showing an example of magnetizing patterns formed on the magnetic faces of first and second magnetic recording layers in the torque detector shown in FIG. 7.

FIG. 8 shows an example of magnetizing patterns which are respectively formed on the magnetic faces of the first and second magnetic recording layers 111 and 112 in the preparatory step. In FIG. 8, the lines drawn on the magnetic faces of the magnetic recording layers 111 and 112 indicate the positions in which magnetic pulse signals are provided. In the case where the rotary shaft 110 is rotated at a constant speed and the number of rotations $N_0$ for a unit time, the magnetizing patterns on the magnetic faces of the magnetic recording layers 111 and 112 have a lot of magnetic poles arranged at a constant pitch over the entire periphery correspondingly to the recording signal having the constant frequency $f_0$ outputted from the recording circuit 115. However, the number of rotations $N_0$ for a unit time of the rotary shaft 110 is actually varied. Consequently, the magnetizing patterns on the magnetic faces of the magnetic recording layers 111 and 112 are varied in pitch between magnetic poles as shown in FIG. 8. The magnetic recording layers 111 and 112 are formed on the rotary shaft 110 and receive magnetic pulse signals which are synchronous with each other based on the output signal of the recording circuit 115. Consequently, the magnetizing patterns on the magnetic faces of the magnetic recording layers 111 and 112 are varied in the same form as the variation of the rotary speed of the rotary shaft 110.

Figure 9:
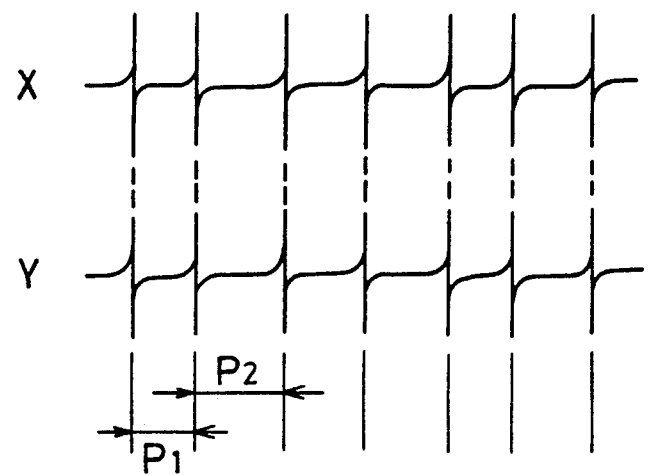
FIG. 9 is a signal waveform diagram of each portion of the torque detector shown in FIG. 7 in the case where torque is not applied to a rotary shaft.

FIG. 9 shows the waveforms of the first and second reproducing signals X and Y which are shaped when the magnetizing patterns formed on the magnetic faces of the first and second magnetic recording layers 111 and 112 are read out with the rotary shaft 110 unloaded in similar to the preparatory step. The reproducing signals X and Y are signals having pulse trains which are shaken in positive and negative directions correspondingly to the fact that the magnetizing patterns on the magnetic faces of the magnetic recording layers 111 and 112 are formed by the magnetic pulse signals. The variation of the pitch between magnetic poles on the magnetic faces of the magnetic recording layers 111 and 112 overlaps that of the rotary speed of the rotary shaft 110 at the time of magnetizing pattern reading. Consequently, the space between pulses is greatly varied as shown by P1 and P2 in FIG. 9. In other words, the frequencies f of the reproducing signals X and Y are greatly varied.

However, the reproducing signals X and Y are completely in-phase. Differently from the torque detector using two magnetic rotary encoders, even if the circumferential positional shift of the rotary shaft 110 is caused between the first and second magnetic heads 113 and 114 when they are provided opposite to the magnetic faces of the first and second magnetic recording layers 111 and 112, the positional shift of the magnetic heads does not cause the offset of the phase difference between the reproducing signals X and Y. In the case here the offset of the phase difference is caused between the reproducing signals X and Y owing to the residual distortion of the rotary shaft 110 with no torque applied thereto, the operation of the preparatory step is executed again to reform the magnetizing patterns onto the magnetic faces of the magnetic recording layers 111 and 112. Consequently, it is possible to cancel the offset of the phase difference. Accordingly, the copying operation is periodically executed so that the offset of the phase difference between the reproducing signals X and Y can always be set to 0.

Figure 10:
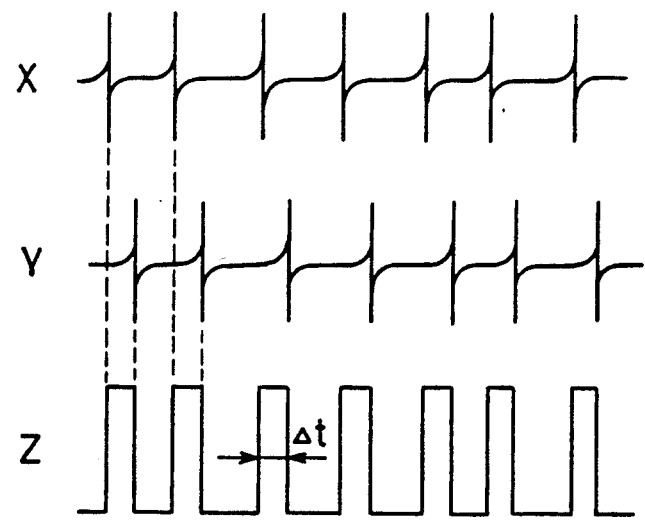
FIG. 10 is a signal waveform diagram of each portion of the torque detector shown in FIG. 7 in the case where torque is applied to the rotary shaft.

There will be described a torque detection step in the latter part. When the torsional deformation occurs on the rotary shaft 110 owing to the torque caused by the load, the phase difference, which is proportional to a quantity of torsion of the rotary shaft 110, is caused between the reproducing signals X and Y of the first and second magnetic heads 113 and 114. In upper and middle parts of FIG. 10, there are shown the waveforms of the first and second reproducing signals X and Y having the phase difference therebetween. The reproducing signals X and Y are provided to the phase difference detecting circuit 119 through the amplifier 116, filter 117 and waveform shaping circuit 118.

The phase difference detecting circuit 119 internally generates a phase difference signal Z having a pulse width which is equal to the space between the pulses of the first and second reproducing signals X and Y, i.e., the phase difference $\Delta t$ between the reproducing signals X and Y. The phase difference signal Z has its frequency f greatly varied and its pulse width equal to the phase difference $\Delta t$ between the reproducing signals X and Y as shown in the lower part of FIG. 10. The phase difference detecting circuit 119 detects the phase difference $\Delta t$ in a unit of time between the reproducing signals X and Y by measuring the pulse width of the phase difference signal Z. In other words, even if the frequencies f of the reproducing signals X and Y are varied, the phase difference $\Delta t$ between the reproducing signals X and Y can properly be detected. The phase difference $\Delta t$, which is precisely obtained, is provided to the torque calculation circuit 120.

In the case where the torsional angle $\theta$ of the rotary shaft 110 is to be calculated, there are needed both the phase difference $\Delta t$ and the number of rotations N for a unit time of the rotary shaft 110. Differently from the torque detector using two sets of magnetic disks and magnetic heads, the number of rotations N is not found by the first and second reproducing signals X and Y based on the magnetizing patterns on the magnetic faces of the first and second magnetic recording layers 111 and 112 but by the gear 130 on the rotary shaft 110, the electromagnetic pickup 131 provided close and opposite to the gear 130, and the rotary speed detector 132 which receives the pulse train from the electromagnetic pickup 131. The number of rotations N can be obtained as follows. The gear 130, which is coaxially fixed to the rotary shaft 110, is rotated at the same speed as the rotary shaft 110. As described above, the gear 130 has teeth formed at a constant pitch on its outer periphery. The non-movable electromagnetic pickup 131 outputs one pulse to the rotary speed detector 132 every time the teeth of the gear 130 pass therethrough. The number of rotations N for a unit time of the rotary shaft 110 is obtained by the rotary speed detector 132 based on the measured value of the frequency f of the pulse train outputted from the electromagnetic pickup 131;

$$N = f/W \tag{8}$$

where W is the number of teeth preformed on the outer periphery of the gear 130 and is a known invariant which is not affected by the variation of the number of rotations $N_0$ for a unit time of the rotary shaft 110 in the preparatory step. In addition, the teeth are formed at a constant pitch on the outer periphery of the gear 130 as described above. Differently from the torque detector using two sets of magnetic disks and magnetic heads, therefore, the frequency f of the pulse train outputted from the electromagnetic pickup 131 is affected by only the variation of the rotary speed of the rotary shaft 110 in the torque detection step. In other words, the number of rotations N for a unit time of the rotary shaft 110 can be obtained more precisely as compared with the torque detector using two sets of magnetic disks and magnetic heads.

The torque calculation circuit 120 calculates the torsional angle $\theta$ of the rotary shaft 110 with the formula (3) based on the phase difference $\Delta t$ provided from the phase difference detecting circuit 119 and the number of rotations N for a unit time provided from the rotary speed detector 132. The torque T applied to the rotary shaft 110 is calculated with the formula (3) based on the torsional angle $\theta$. The result of calculation is outputted as a torque detection value. The applied torque T may directly be obtained by the phase difference $\Delta t$ and the number of rotations N with the formula (7) without calculating the torsional angle $\theta$ of the rotary shaft 110.

The phase difference detecting circuit 119 according to the present embodiment can internally generate the phase difference signal Z having a pulse width which is equal to the phase difference $\Delta t$ between the first and second reproducing signals X and Y even if one pulse is generated as the reproducing signals X and Y every time the rotary shaft 110 is once rotated. In addition, the phase difference detecting circuit 119 can detect the phase difference Δt in a unit of time between the reproducing signals X and Y by measuring the pulse width of the phase difference signal Z. Accordingly, even if magnetization is applied in the form of only one pulse onto the magnetic faces of the first and second magnetic recording layers 111 and 112 in the preparatory step, the phase difference detecting circuit 119 can detect the phase difference Δt between the reproducing signals X and Y in the torque detection step. In the case where there are considered a sampling time, the assumed maximum torque value, the rotary speed of the rotary shaft 110 and the like at the time of torque calculation, it is preferred that magnetization is applied in the form of a plurality of pulses onto the magnetic faces of the magnetic recording layers 111 and 112 in practice. In this case, it is desired that the pitch between magnetic poles is constant.

In place of the first and second magnetic recording layers 111 and 112, there may be used two magnetic recording mediums such as magnetic drums, magnetic disks and the like which are coaxially fixed to the rotary shaft 110. There may be adopted a simple method in which a magnetic tape of an audio tape recorder or the like is wound and bonded onto two portions on the rotary shaft 110.

In place of the combination of the gear 130 and the electromagnetic pickup 131, the following structure can be adopted to detect the number of rotations N for a unit time of the rotary shaft 110. By way of example, a circular slit plate may be combined with an optical pickup. The circular slit plate has a lot of slits arranged at a constant pitch in a circumferential direction. The optical pickup includes a light emitting element and a light receiving element. The slit plate is coaxially fixed to the rotary shaft 110. The light emitting element and the light receiving element of the optical pickup are non-movably provided opposite to each other through the slit plate. Only in the case where the slits provided on the slit plate, which is rotated together with the rotary shaft 110, are positioned on a straight line connecting the light emitting element and the light receiving element, the light emitted from the light emitting element reaches the light receiving element. Accordingly, there can be obtained a pulse train having a frequency, which is proportional to the number of rotations N for a unit time of the rotary shaft 110, by the light receiving element. The following construction can be adopted. More specifically, a continuous cylindrical magnetic face is formed as a third magnetic recording layer over the entire periphery of the rotary shaft 110 in similar to the first and second magnetic recording layers 111 and 112. The magnetic face is premagnetized with a predetermined pattern such that a lot of magnetic poles are arranged at a constant pitch over the entire periphery of the magnetic face in similar to the magnetic scale of the magnetic rotary encoder. The third magnetic face thus premagnetized can be used in place of the gear 130. In this case, the third magnetic head only for reproducing is non-movably provided close and opposite to the magnetic face of the third magnetic recording layer in place of the electromagnetic pickup 131. Furthermore, there can be utilized various means apart from the means for detecting the phase difference Δt including the first and second magnetic recording layers 111, 112 and the like in order to detect the number of rotations N for a unit time of the rotary shaft 110.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A torque detector for detecting torque applied to a rotary shaft to be rotated, comprising:

a first magnetic recording medium having a magnetic face and a cyclic magnetizing pattern preformed at a constant pitch on the magnetic face, and fixed onto a peripheral face of the rotary shaft and rotated together with the rotary shaft, a second magnetic recording medium having a magnetic face, and fixed onto the peripheral face of the rotary shaft apart from the first magnetic recording medium by a predetermined distance in the axial direction of the rotary shaft and rotated together with the rotary shaft, a first magnetic head non-movably provided opposite to the magnetic face of the first magnetic recording medium for reading out the cyclic magnetizing pattern on the magnetic face of the first magnetic recording medium while the rotary shaft is rotated and outputting a cyclic electric signal corresponding to the cyclic magnetizing pattern as a first reproducing signal.

a second magnetic head non-movably provided opposite to the magnetic face of the second magnetic recording medium for receiving a recording signal in synchronous with the first reproducing signal outputted from the first magnetic head while the rotary shaft is rotated with no torque applied thereto and forming a magnetizing pattern corresponding to the recording signal on the magnetic face of the second magnetic recording medium, and for reading out the magnetizing pattern formed on the magnetic face of the second magnetic recording medium while the rotary shaft is rotated with torque applied thereto and outputting a cyclic electric signal corresponding to the magnetizing pattern as a second reproducing signal.

phase difference and rotary speed detection means for receiving the first and second reproducing signals which are simultaneously outputted from the first and second magnetic heads while the rotary shaft is rotated with torque applied thereto and detecting phase difference over a predetermined unit of time between the first and second reproducing signals and the number of rotations over said predetermined unit of time of the rotary shaft based on one of the first and second reproducing signals, and torque calculation means for calculating the torque applied to the rotary shaft based on the phase difference and the number of rotations of the rotary shaft detected by the phase difference and rotary speed detection means.

2. A torque detector according to claim 1, wherein the first magnetic recording medium includes a magnetic face having a plurality of magnetic pattern layers formed at a constant pitch over the entire periphery of the rotary shaft such that the plurality of magnetic pattern layers are separated from one another and individually premagnetized.

3. A torque detector according to claim 1, wherein the first and second magnetic recording mediums have respective cylindrical magnetic faces continuously formed over the entire periphery of the rotary shaft, and the cylindrical magnetic face of the first magnetic recording medium is solely, cyclically premagnetized such that a plurality of magnetic poles are arranged at a constant pitch in the circumferential direction of the cylindrical magnetic face of the first magnetic recording medium.

4. A torque detector according to claim 1, wherein said torque calculation means calculates said torque in accordance with the formula:

$$T = \pi^2 G d^4 \Delta t N / 16 L$$

where G is a transverse elastic modules;d is a diameter of the rotary shaft; $\Delta t$ is the phase difference measured over the predetermined unit of time; N is the number of rotations of the rotary shaft over the predetermined unit of time and L is a length of the rotary shaft.

5. A torque detector for detecting torque applied to a rotary shaft in a power transmission system of a car including a first rotary shaft to be rotated by power of an engine and a second rotary shaft removably connected to the first rotary shaft for transmitting the power of the engine, comprising;
 a first magnetic recording medium having a magnetic face and a cyclic magnetizing pattern preformed at a constant pitch on the magnetic face, and fixed onto a peripheral face of one of the first and second rotary shafts and rotated together with the rotary shaft.
 a second magnetic recording medium having a magnetic face, and fixed onto a peripheral face of the other rotary shaft and rotated together with the rotary shaft,
 a first magnetic head non-movably provided opposite to the magnetic face of the first magnetic recording medium for reading out the cyclic magnetizing pattern on the magnetic face of the first magnetic recording medium while the first and second rotary shafts are connected with each other and rotated and outputting a cyclic electric signal corresponding to the cyclic magnetizing pattern as a first reproducing signal,
 a second magnetic head non-movably provided opposite to the magnetic face of the second magnetic recording medium for receiving a recording signal in synchronous with the first reproducing signal outputted from the first magnetic head while the first and second rotary shafts are connected with each other and rotated with a predetermined engine reference power and for forming a magnetizing pattern corresponding to the recording signal on the magnetic face of the second magnetic recording medium, and for reading out the magnetizing pattern formed on the magnetic face of the second magnetic recording medium while the first and second rotary shafts are connected with each other and rotated with an engine power departing from the predetermined engine reference power and outputting a cyclic electric signal corresponding to the magnetizing pattern as a second reproducing signal,
 phase difference and rotary speed detection means for receiving the first and second reproducing signals which are simultaneously outputted from the first and second magnetic heads while the first and second rotary shafts are connected with each other and rotated with the engine power departing from the predetermined engine reference power and detecting phase difference over a predetermined unit of time between the first and second reproducing signals and the number of rotations over said predetermined unit of time of the second rotary shaft based on one of the first and second reproducing signals, and
 torque calculation means for calculating the torque applied to the second rotary shaft with the engine holding the power departing from the predetermined engine reference power based on the phase difference and the number of rotations of the rotary shaft detected by the phase difference and rotary speed detection means.

6. A torque detector for detecting torque applied to a rotary shaft to be rotated, comprising:
 first and second magnetic recording mediums having respective magnetic faces, and fixed onto a peripheral face of the rotary shaft apart from each other by a predetermined distance in the axial direction of the rotary shaft and rotated together with the rotary shaft,
 first and second magnetic heads non-movably provided opposite to the magnetic faces of the first and second magnetic recording mediums respectively for receiving a common recording signal while the rotary shaft is rotated with no torque applied thereto and forming respective identical magnetizing patterns corresponding to the common recording signal on the magnetic faces of the first and second magnetic recording mediums, and for reading out the respective magnetizing patterns formed on the magnetic faces of the first and second magnetic recording mediums while the rotary shaft is rotated with torque applied thereto and outputting respective cyclic electric signals corresponding to the respective magnetizing patterns as first and second reproducing signals.
 phase difference detection means for receiving the first and second reproducing signals which are simultaneously outputted from the first and second magnetic heads while the rotary shaft is rotated with torque applied thereto and detecting phase difference over a predetermined unit of time between the first and second reproducing signals.
 rotary speed detection means including conversion means for generating a pulse train having a constant frequency, which is proportional to a constant rotary speed of the rotary shaft, and a rotary speed detector for detecting the number of rotations over said predetermined unit of time of the rotary shaft based on the pulse train provided from the conversion means while the phase difference detection means receives the first and second reproducing signals having the phase difference, and
 torque calculation means for calculating the torque applied to the rotary shaft based on the phase difference detected by the phase difference detection means and the number of rotations of the rotary shaft detected by the rotary speed detection means.

7. A torque detector according to claim 6, wherein the first and second magnetic recording mediums have respective cylindrical magnetic faces continuously formed over the entire periphery of the rotary shaft.

8. A torque detector according to claim 6, wherein the conversion means includes;
- a gear having a plurality of teeth formed at a constant pitch over the whole outer peripheral face, coaxially fixed to the rotary shaft and rotated together with the rotary shaft, and
- an electromagnetic pickup non-movably provided such that the teeth of the gear sequentially pass through its vicinity while the rotary shaft is rotated for generating the pulse train such that one pulse is outputted every time each of the teeth of the gear passes through its vicinity.

9. A torque detector according to claim 6, wherein the conversion means includes;
- a slit plate having a plurality of slits formed at a constant pitch over the entire periphery in a circumferential direction, coaxially fixed to the rotary shaft and rotated together with the rotary shaft, and
- an optical pickup having a light emitting element and a light receiving element which are non-movably provided opposite to each other through the slit plate, the light receiving element generating the pulse train such that one pulse is outputted every time light emitted from the light emitting element passes through each of the plurality of slits of the slit plate so as to reach the light receiving element.

10. A torque detector according to claim 6, wherein the conversion means includes;
- a third magnetic recording medium having a cylindrical magnetic face continuously formed over the entire periphery of the rotary shaft and a cyclic magnetizing pattern preformed on the cylindrical magnetic face of the third magnetic recording medium such that a plurality of magnetic poles are arranged at a constant pitch in a circumferential direction of the cylindrical magnetic face of the third magnetic recording medium, and
- a third magnetic head non-movably provided opposite to the magnetic face of the third magnetic recording medium for reading out the cyclic magnetizing pattern on the magnetic face of the third magnetic recording medium while the rotary shaft is rotated and outputting a cyclic electric signal corresponding to the cyclic magnetizing pattern as the pulse train.

11. A torque detector according to claim 6, wherein said torque calculation means calculates said torque in accordance with the formula:

$$T = \pi^2 G d^4 \Delta t N / 16 L$$

where G is a transverse elastic modules: d is a diameter of the rotary shaft: $\Delta t$ is the phase difference measured over the predetermined unit of time; N is the number of rotations of the rotary shaft over the predetermined unit of time and L is a length of the rotary shaft.

* * * * *